United States Patent
Ziegler et al.

(10) Patent No.: US 9,203,230 B2
(45) Date of Patent: Dec. 1, 2015

(54) LINE PROTECTION SWITCH

(71) Applicant: Tyco Electronics AMP GmbH, Bensheim (DE)

(72) Inventors: Titus Ziegler, Berlin (DE); Thomas Haehnel, Berlin (DE); Matthias Kroeker, Mittenwalde-Ragow (DE); Udo Gabel, Berlin (DE); Peter Sandeck, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 14/385,981

(22) PCT Filed: Mar. 5, 2013

(86) PCT No.: PCT/EP2013/054441
§ 371 (c)(1),
(2) Date: Sep. 17, 2014

(87) PCT Pub. No.: WO2013/139597
PCT Pub. Date: Sep. 26, 2013

(65) Prior Publication Data
US 2015/0084721 A1    Mar. 26, 2015

(30) Foreign Application Priority Data
Mar. 21, 2012  (DE) .......................... 10 2012 102 431

(51) Int. Cl.
*H02H 3/08*   (2006.01)
*H01H 71/24*  (2006.01)
*H01H 50/18*  (2006.01)
*H01H 50/54*  (2006.01)
*H01H 50/64*  (2006.01)
*H01H 1/20*   (2006.01)
*H01H 3/22*   (2006.01)

(52) U.S. Cl.
CPC ................. *H02H 3/08* (2013.01); *H01H 50/18* (2013.01); *H01H 50/54* (2013.01); *H01H 50/64* (2013.01); *H01H 71/2418* (2013.01); *H01H 1/20* (2013.01); *H01H 3/222* (2013.01); *H01H 71/2436* (2013.01)

(58) Field of Classification Search
CPC ... H01H 71/2418; H01H 50/18; H01H 50/54; H01H 50/64; H01H 1/20; H01H 3/222; H01H 71/2436; H02H 3/08
See application file for complete search history.

(56) References Cited

U.S. PATENT DOCUMENTS 2,916,579 A * 12/1959 Kesselring et al. ........... 335/147
3,824,508 A *  7/1974 Terracol ......................... 335/16

(Continued)

FOREIGN PATENT DOCUMENTS

DE          3110461 A1     9/1982
GB          682667 A   * 11/1952

*Primary Examiner* — Mohamad Musleh
(74) *Attorney, Agent, or Firm* — Faegre Baker Daniels LLP

(57) ABSTRACT

The invention relates to a line protection switch (1) for protecting an electrical load circuit from an over-current which exceeds a permissible load current. In order to provide a structurally simple, compact and rapidly actuating line protection switch, it is provided with a switching member (6) which can be moved from an operating position into a protection position. Contact elements (2A, 2C) of the line protection switch (1) which can be connected to the load circuit are closed in the operating position and opened in the protection position. The line protection switch (1) according to the invention further has a retention member (10) which produces a magnetic retention field (MH) which is independent of the load current and by means of which the switching member (6) is retained in the operating position, and a counter-force member (14) which is independent of the load current and by means of which the switching member (6) is retained in the protection position. There is further provided an actuation member (15) which can be moved with the switching member (6) and through which load current flows in the operating position and which produces a magnetic actuation field (MA) which is dependent on the load current and which is superimposed on the magnetic retention field (MH).

16 Claims, 4 Drawing Sheets

(56) References Cited

U.S. PATENT DOCUMENTS

| | | | |
|---|---|---|---|
| 3,843,944 A * | 10/1974 | Kupec et al. | 335/196 |
| 4,025,883 A | 5/1977 | Slade et al. | |
| 4,513,270 A * | 4/1985 | Belbel et al. | 335/195 |
| 4,593,260 A * | 6/1986 | Guero et al. | 335/195 |
| 4,719,438 A * | 1/1988 | Mrenna et al. | 335/38 |
| 5,959,517 A * | 9/1999 | Wieloch et al. | 335/16 |

* cited by examiner

View A

LINE PROTECTION SWITCH

BACKGROUND

The invention relates to a line protection switch for protecting an electrical load circuit from an over-current which exceeds a permissible load current.

Such line protection switches are known from the prior art. An example of such a line protection switch is, for example, a relay in which a coil through which load current flows in the event of over-current attracts an armature which is connected to a switching member. As long as the load current is in the permissible range, a spring acts counter to the magnetic attraction force of the coil. As the load current increases, the force produced by the coil also increases. As soon as the load current reaches an over-current value, the counter-force of the coil exceeds the retention force of the spring and the switching circuit is interrupted by means of mechanical actuation of a switching member which is connected to the armature. In order to prevent renewed closure of the switching circuit owing to the over-current which is no longer present, mechanical or magnetic catch mechanisms are often provided. These not only increase the number of necessary components in the switch and consequently the weight and volume thereof, but also constitute additional potential sources of error. Furthermore, it is necessary with magnetic catch mechanisms to guide the load current path inside the switching device once more.

A further disadvantage of this type of line protection switch is that, owing to the increasing forces, the components must be constructed in a correspondingly stable and solid manner. This not only increases the weight and the size of the line protection switch as a whole, but also allows the line protection switch to become more inert owing to the masses to be moved.

SUMMARY

An object of the present invention is therefore to provide a line protection switch which is smaller and lighter. Furthermore, the line protection switch is intended to enable a rapid actuation time.

This object is achieved according to the invention by a line protection switch having a switching member which can be moved from an operating position into a protection position, contact elements of the line protection switch which can be connected to the load circuit being closed in the operating position and being opened in the protection position, and having a retention member which produces a magnetic retention field which is independent of the load current and by means of which the switching member is retained in the operating position, and having a counter-force member which is independent of the load current and by means of which the switching member is retained in the protection position, and having an actuation member which is integrated in the switching member and through which load current flows in the operating position and which produces a magnetic actuation field which is dependent on the load current and which is superimposed on the magnetic retention field.

Owing to the integration of the actuation member in the switching element, it is possible to significantly reduce the number of components of the line protection switch, which leads to lighter and smaller line protection switches. Furthermore, the line protection switches according to the invention are faster than the previous line protection switches since the mass to be moved can be reduced. Since the magnetic actuation field is dependent on the load current, the load current which flows through the switching member can be used for the production thereof, which simplifies the structural configuration.

Advantageous developments and embodiments which can be freely combined with each other are described below.

For instance, according to a first advantageous embodiment, a retention force produced by the magnetic retention field and/or a counter-force produced by the counter-force member may be independent of the load current. This embodiment simplifies the adjustment of the actuation point of the line protection switch which is dependent on the load current and which is consequently dependent only on the magnetic actuation field. The actuation characteristics may be adjusted using only the actuation member.

In particular, the retention member may not be electrified, that is to say, may be independent of electrical energy. Consequently, the retention member also functions when the energy supply is interrupted. In such a case, the retention member may retain the line protection switch in a closed state, even when the current flow is interrupted since the retention member still produces the retention force.

A counter-force member which is independent of the load current may, for example, apply a constant and consequently well-defined counter-force. Furthermore, a counter-force member which is independent of the load current affords the advantage that its components have to be constructed only for a precisely defined force path.

In particular, the counter-force member may be independent of electrical energy. It is thereby ensured that the counter-force member also functions in the event of a power failure. Automatic actuation in the event of a power failure can consequently be ensured since the counter-force member still produces the counter-force and the switching element can move into the protection position. The counter-force member may be a spring or a resilient element. In a very simple case, the counter-force member operates only with gravitational force, which acts as a counter-force.

Although the counter-force member may be independent of electrical energy, it is completely conceivable for the counter-force member to be dependent on a current which is preferably independent of the load current. The counter-force can thereby be well-defined since, for example, only the magnitude of this current is required for the calculation thereof.

In order to keep the construction simple and to save weight, volume and production costs, the load current path may be part of the switching member. For example, the load current path may extend through a movable contact bridge, which connects the contact elements of the electrical circuit to each other in a conductive manner and is part of the switching element. This contact bridge may be able to be advanced towards the contact elements, for instance, in a direction which is orientated from the operating into the protection position. In particular, the load current may, when flowing through the switching member, produce a magnetic field which is used to actuate the line protection switch.

The retention member may comprise a permanent magnet as a magnetic field source of the magnetic retention field. Compared with a coil through which current flows, this embodiment leads to a more compact structure.

Nonetheless, in place of or in addition to the permanent magnet, a coil may also be provided in the retention member. In the event of a power failure, the magnetic field of the coil would collapse and the line protection switch would be automatically actuated owing to the action of the counter-force member. Consequently, in addition to the over-current as an actuation criterion, a power failure can also be implemented as an additional actuation criterion of the line protection switch. In contrast to the prior art, however, the coil does not necessarily have to serve to actuate the line protection switch. It can therefore be controlled by means of a current which is independent of the load current. Other actuation points for the line protection switch can be determined by this load-current-independent current.

The integration of the switching member and actuation member may be carried out in a simple manner by the region of the load current path which extends through the switching member and which is separated from the contact elements in the operating position at the same time serving to produce the magnetic actuation field when load current flows through it.

A simple construction is produced in particular when, according to a development, the magnetic actuation field is induced by the load current. The magnetic field produced by a conductor through which current flows can thus be used as a magnetic actuation field.

According to another advantageous embodiment, the actuation member may be formed by a movable contact bridge which is arranged between the contact elements. The contact bridge consequently performs a dual function as a conductor for the load current and as an actuator in the event of over-current.

A contribution to a compact and simple construction is also achieved if the actuation member is located in the load current path between the contact elements and/or if the load current path extends through the line protection switch in a non-branched manner.

A compact structure is also possible when, in the operating position, the direction of the magnetic retention field in an armature of the switching element extends perpendicularly relative to a connection line between the contact elements. The contact elements can consequently be brought closer together in structural terms.

The retention member, at least in the operating position, may produce a magnetic retention force which acts counter to a counter-force of the counter-force member. In particular when viewed from the switching member, the retention force is orientated in the direction of the operating position and the counter-force in the direction of the protection position.

In the operating position, the retention force acting on the switching member is preferably greater than the counter-force so that this position is taken up in a stable manner.

In order also to be able to take up the protection position in a stable manner, the counter-force acting on the switching member is greater than the retention force in the protection position.

In another embodiment, the retention force may decrease more powerfully than the counter-force in a movement direction from the operating position into the protection position.

In order to enable a compact structure with magnetic actuation and retention fields which extend perpendicularly relative to each other, the load current path may extend in an S-shape or Z-shape in the region of the switching member between the contact elements. The contact bridge and armature can thereby be arranged in a space-saving cross-wise manner and a parallel extent of the load current path and magnetic retention field can nonetheless be achieved in the armature.

In order to group the magnetic field lines in the line protection switch, it may comprise a magnetic circuit, for example, of flow conducting elements. The flow conducting elements may be produced from a magnetically conductive material, for example, from a ferromagnetic material. The magnetic field source may be part of the magnetic circuit and be inserted into the ring closure. For example, a permanent magnet, magnetic field conducting elements and/or the armature may be elements of the magnetic circuit. It is particularly advantageous for the armature to be part of the magnetic circuit at least in the operating position. In the protection position, the armature may be moved away from the magnetic circuit. In particular, the magnetic circuit may be part of the retention member and/or the switching member.

The interaction according to the invention between the magnetic actuation field and magnetic retention field may, on the one hand, be based on a substantially linear superimposition of these two magnetic fields. In this embodiment, the magnetic actuation field and the magnetic retention field are superimposed in a cumulative manner. The magnetic retention field may in particular be increasingly weakened by the magnetic actuation field which becomes stronger as the load current increases. The retention force is reduced accordingly. At the actuation point, the retention force is just smaller than the counter-force and the actuation member moves under the action of the counter-force into the protection position.

In order to achieve an addition or subtraction of the magnetic fluxes which is as efficient as possible in terms of values, the magnetic actuation field and the magnetic retention field may be superimposed in a parallel manner in the switching member, in particular in the magnetic circuit, in particular in the armature.

On the other hand, the interaction according to the invention may be based on a non-linear superimposition of the magnetic actuation and retention field. With magnetically soft or magnetically hard materials, the magnetisation in the material no longer follows an external, increasingly strong magnetic field in a linear manner, that is to say, the magnetisation is not twice as large when the external magnetic field is twice as strong, but instead less than double the value of the original magnetisation. The vector of the magnetisation can thus no longer be calculated with strong magnetic fields by means of simple vector addition. In particular, a magnetic saturation occurs when the acting magnetic field exceeds a saturation threshold value. From this threshold value, an increase of the magnetic field applied from the outer side no longer leads to an increase of the magnetic field inside the material and consequently also no longer to an increase of the magnetic forces. When the acting magnetic field is not parallel with the magnetic flux in the material, the direction of the magnetic flux can thereby be rotated. In such a case, the retention force at the actuation point is rotated with respect to the operating position, but not necessarily reduced in terms of value. Owing to the non-linear addition and the resultant rotation, only the component of the retention force extending parallel with the counter-force or in the movement direction is reduced. At the actuation point, the component of the retention force acting in the movement direction has just become smaller than the counter-force. It is particularly advantageous for a portion of the magnetic circuit to be magnetically saturated at least at the actuation point since the line protection switch can then be actuated in a particularly easy and precisely defined manner. This portion is in particular the portion in which the magnetic actuation field and retention field are superimposed. The saturated portion may in particular be located in the magnetic circuit. Owing to the superimposition of the magnetic fields, the retention force may be influenced in such a manner that it can no longer retain the armature. For example, the superimposition could take place in the actuation member, in the switching member or in the magnetic field conducting elements. In order to keep the construction as simple and as compact as possible, in an advantageous embodiment, the portion which is or which becomes magnetically saturated is located in the armature.

A rotation of the retention force in accordance with the load current can be achieved in particular in that the magnetic actuation field and the magnetic retention field in the switching element, in particular in the armature, are orientated at an angle to each other. The greatest rotation in the case of a change of the load current can be achieved when the magnetic actuation field and the magnetic retention field extend perpendicularly to each other.

The non-linear superimposition of the magnetic retention field and actuation field affords the additional advantage that the rotation of the vector, in contrast to a cumulative superimposition in terms of value, may be independent of the direction of the current which produces the magnetic actuation field, in this case in particular the load current. If the magnetic actuation field and magnetic retention field extend perpendicularly relative to each other, the actuation behaviour is even symmetrical relative to the current direction.

In order to achieve such an actuation which is independent of direction, the load current path in the actuation member may extend parallel with the direction of the magnetic retention field in a portion of the magnetic circuit in the switching member, in particular in the armature. In this portion of the switching element, in particular in the armature, the magnetic actuation field and magnetic retention field may be superimposed on each other in a perpendicular manner.

Regardless of the type of superimposition, it is advantageous if, in the operating position in the switching member, a magnetic retention field which is as strong as possible and consequently a retention force which is as strong as possible act. In order to be able to use magnetic field sources which are as small as possible, the magnetic retention field should therefore be conducted to the switching member in the operating position via magnetically hard, but preferably magnetically soft magnetic field conducting elements. The magnetic field conducting elements ensure a loss-free or low-loss magnetic flux of the magnetic retention field from the magnetic field source to the switching member.

If the contact elements are separated from each other, switching arcs often occur in the line protection switch at the contact faces. In order to protect the retention member and/or the counter-force member, at least one protection wall may be arranged between the contact faces of the line protection switch and the retention member.

The protection wall may perform a dual function by having, according to another advantageous embodiment, a guiding face along which the switching member is guided in a movement direction.

The switching member may have a guiding element which is guided along the guiding face in order to obtain a precise movement of the switching member. The guiding element may be constructed in a pot-like manner and receive the retention and/or counter-force member. As additional protection, the guiding element may extend between, on the one hand, the contact points and, on the other hand, the retention and/or counter-force member.

In order to protect against switching arcs, the magnetic retention field may also act in the region of the contact points between the contact elements and the switching element as an extinguishing magnetic field.

The invention is explained in greater detail below with reference to embodiments and the drawings. The features which are different in the individual embodiments can be combined with each other in accordance with the above explanations. Furthermore, in accordance with the above descriptions, individual features in the embodiments may also be omitted if the advantage connected with this feature is not significant in the specific application.

BRIEF DESCRIPTION OF THE DRAWINGS

In the drawings:

FIG. 1A is a side view of a line protection switch 1 according to the invention.

DETAILED DESCRIPTION

Figure 1A:
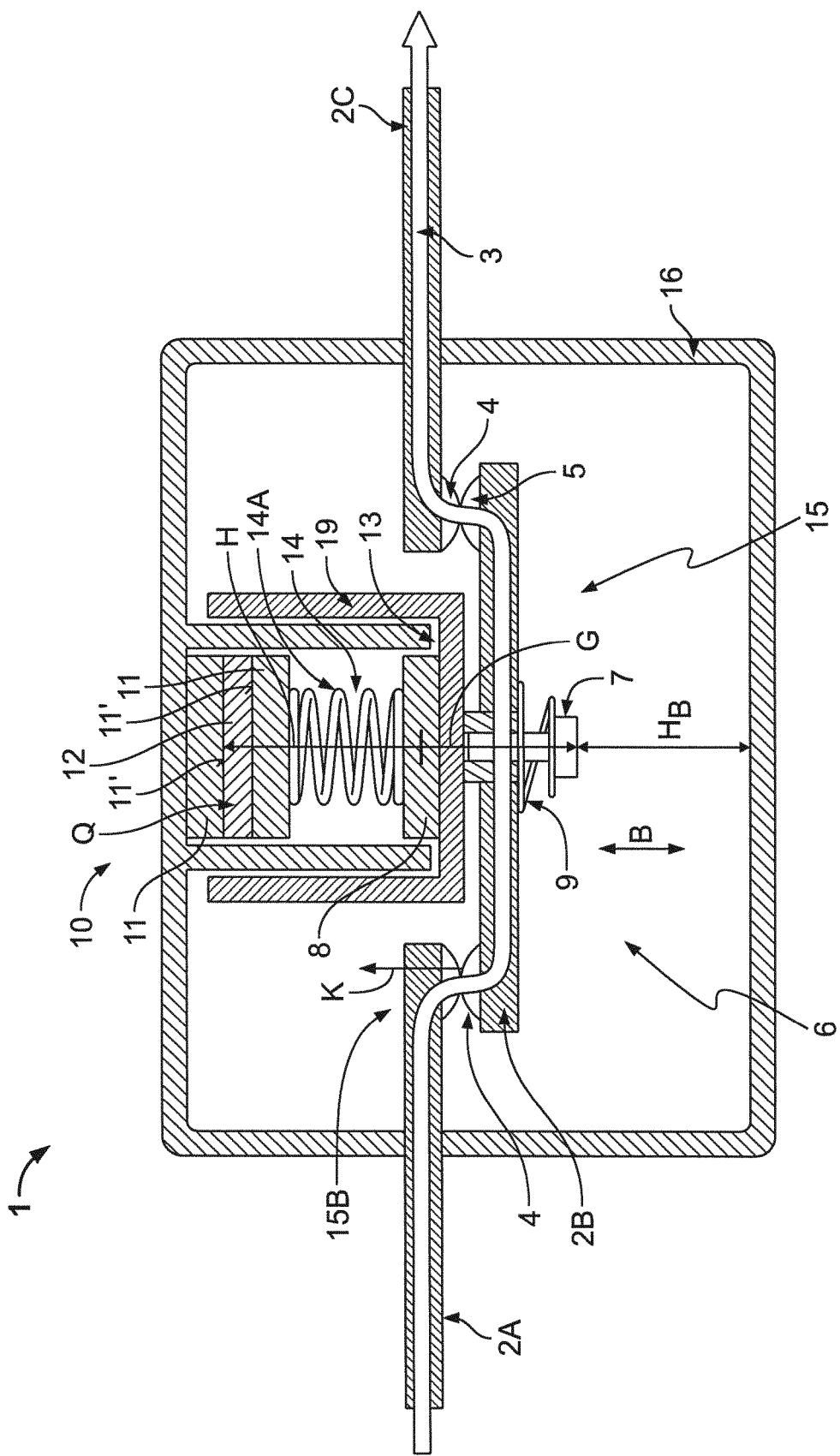
FIG. 1A is a schematic side view of a line protection switch according to the invention in the closed state.

The line protection switch 1 is illustrated in FIG. 1A in the closed state in which an electric current can flow from a first contact element 2A via a contact bridge 2B to a second contact element 2C along a load current path 3. The first contact element 2A or the second contact element 2C are connected to the contact bridge 2B in an electrically conductive manner by means of contact points 4. The contact bridge 2B also has such contact points 4 and is connected in a conductive manner to the first contact element 2A or the second contact element 2C at electrical contact faces 5. The contact bridge 2B is thus part of a movable switching member 6 by means of which an electrical circuit can be closed or opened.

The contact bridge 2B is retained by means of a securing element 7 on an armature 8 of the line protection switch 1 which is also part of the switching member 6. Between the armature 8 and the contact bridge 2B, a resilient element 9 is arranged. The contact bridge 2B can be redirected relative to the armature 8 counter to a resilient force produced by the resilient element 9. The resilient force produced by the resilient element 9 is directed from the contact points 4 of the contact bridge 2B to the associated contact points of the contact elements 2A, 2C and produces at the contact faces 5 a predetermined contact force. In order to produce the contact force, the armature 8 is moved counter to the action of the resilient force beyond the point at which the contact faces 5 of the contact bridge 2B and contact elements 2A, 2C are in abutment.

The switching member 6 is retained in the line protection switch 1 for movement in a movement direction B. When the switching member 6 is moved in this direction, the line protection switch 1 changes from the closed and consequently electrically conductive state illustrated in FIG. 1A to an open and consequently non-electrically-conductive state. In the closed state of the line protection switch 1, the switching member 6 is in an operating position; in the open state of the line protection switch 1, the switching member 6 is in a protection position. In the operating position, current can thus flow from the first contact element 2A to the second contact element 2C; a connected electrical circuit can thereby be closed.

A retention member 10 retains the switching member 6 in the operating position. The retention member 10 of FIG. 1A has magnetic field conducting elements 11 which are secured to the frame and which are preferably magnetically soft and a magnetic field source Q, for example, a permanent magnet 12. The magnetic field source produces a magnetic retention field $M_H$. Instead of or in addition to the permanent magnet 12, an electromagnet (not illustrated) can also be used. An electromagnet may in particular be used when the line protection switch 1 is intended to be actuated in a controlled manner for test purposes.

The magnetic flux produced by the permanent magnet 12 is fed via coupling faces 11' into the magnetic field conducting elements 11 and directed thereby to the armature 8, which is thereby attracted by the retention member 10. An air gap 13 through which the magnetic flux must flow can be provided between the retention member 10 and the armature 8. However, the retention member 10 may also be in direct mechanical contact with the armature 8, whereby a better magnetic flux transmission is achieved. In a development which is not illustrated, additional magnetic field conducting elements 11 which are secured to the frame may be arranged facing the armature 8.

The line protection switch 1 further has a counter-force member 14, in this instance in the form of a spring 14A. The counter-force member 14 produces at least in the operating position a counter-force G which is directed counter to the retention force H of the retention member 10. The counter-force member 14 presses the switching member 6 out of the operating position into the protection position in which the first contact element 2A is not connected to the second contact element 2C in an electrically conductive manner. Consequently, an electrical circuit which may be connected is not closed in the protection position.

The counter-force G of the counter-force member 14 may be precisely opposed to the retention force H of the retention member 10, but it may also only contain components which oppose the retention force. For example, the counter-force and the retention force may have an angle of 120° with respect to each other.

The counter-force member 14 may be constructed in different manners. In place of the spring 14A or in addition to the spring 14A, any resilient member may also be provided. In a very simple case, the counter-force may be produced only by the gravitational force.

In an alternative embodiment, the movement direction B may extend not in a linear manner but in a rotary manner about an axis which is fixed to the frame. For example, the contact bridge 2B may be arranged rotatably about the securing means 7. In this instance, the counter-force G may produce a torque which acts on the rotatable switching member 6. This may be readily implemented with a torsion spring or rotary (leg) spring in place of the compression spring shown in FIG. 1A, without anything changing in the following description.

In the operating position, at least in the movement direction B, the retention force of the retention member 10 is greater than the counter-force of the counter-force member 14. The retention member 10 and counter-force member 14 thus retain the switching member 6 in a stable manner in the operating position as long as no additional forces are acting.

The retention force H and counter-force G both decrease when the switching member 6 moves in the movement direction B away from the retention member 10 or from the operating position into the protection position. In the protection position, the counter-force is greater than the retention force so that the switching member 6 is retained in the protection position in a stable manner.

In order to achieve such bistability of the line protection switch 1 in the protection position and in the operating position, the retention force decreases to a greater extent than the counter-force as the switching member moves further away from the retention member.

The line protection switch 1 illustrated in this instance further has an actuation member 15 whose actuation actuates the line protection switch 1, that is to say, changes the switching member 6 from the operating position into the protection position. The actuation member is automatically actuated when an over-current is present, that is to say, the load current becomes inadmissibly high. The actuation member 15 comprises a portion of the load current path 3, in this instance the contact bridge 2B, so that the actuation member is integrated in the switching member 6. The contact bridge 2B is consequently at the same time part of the switching member 6 and the actuation member 15.

The actuation member 15 acts in the operating position on the retention member 10 and reduces the retention force thereof acting in the movement direction B. If, at least in the movement direction B, the retention force of the retention member 10 is weaker than the counter-force of the counter-force member 14, the line protection switch 1 is actuated and separates the electrical connection between the first contact element 2A and the second contact element 2C.

The actuation member 15 produces a load-current-dependent magnetic actuation field $M_A$ which is superimposed on the load-current-independent magnetic retention field $M_H$ of the retention member. The magnetic actuation field $M_A$ is produced by the load current itself which flows through the contact bridge 2B arranged in the load current path 3 and induces a magnetic field around the contact bridge. At least in the armature 8, the magnetic actuation field has a component which is opposed to the magnetic retention field. The superimposition of the magnetic actuation field and retention field leads to the weakening of the magnetic retention field and consequently the retention force.

The magnetic actuation field becomes stronger with increasing strength of the load current. The retention force is produced by the magnetic retention field independent of the load current and remains constant. Consequently, the retention force becomes weaker with increasing load current. When a specific load current is reached, the reduced retention force falls below the counter-force and the line protection switch is actuated. At the actuation point, the load current reaches an inadmissible value which can damage structural elements connected to the line protection switch. The line protection switch protects those structural elements from damage by actuation in the event of such an over-current.

In order to influence the action of the load-current-dependent magnetic field on the retention member 10 and, for example, the actuation point at which the switching member 6 jumps into the protection position, magnetic field conducting elements 11 may be fitted at appropriate locations, removed or used in another form. The size of the air gap 13 may also be used to adjust the actuation point.

If magnetic field conducting elements 11 are fitted to the armature 8, owing to the inherent weight of the magnetic field conducting elements this involves increased inertia of the armature 8 and consequently slower actuation. If a rapid actuation is desired, the armature 8 should be as light as possible. In this case, the magnetic field conducting elements 11 are preferably intended to be fitted so as to be secured to the frame.

In order to protect against external influences and/or to screen off external magnetic fields, the line protection switch 1 further has a preferably magnetically soft housing 16.

In order to enable a construction which is as compact and small as possible, both the retention member 10 and the counter-force member 14 are arranged between the contact points 4. As shown in FIG. 1A, the retention member 10, the counter-force member 14 and the actuation member 15 or switching member 6 are in alignment in the movement direction B. The counter-force member 14 is arranged in a spatial region defined by the magnetic field conducting elements.

The spacing between the contact points 4 is greater than the width of the armature 8 of the line protection switch 1.

Figure 1B:
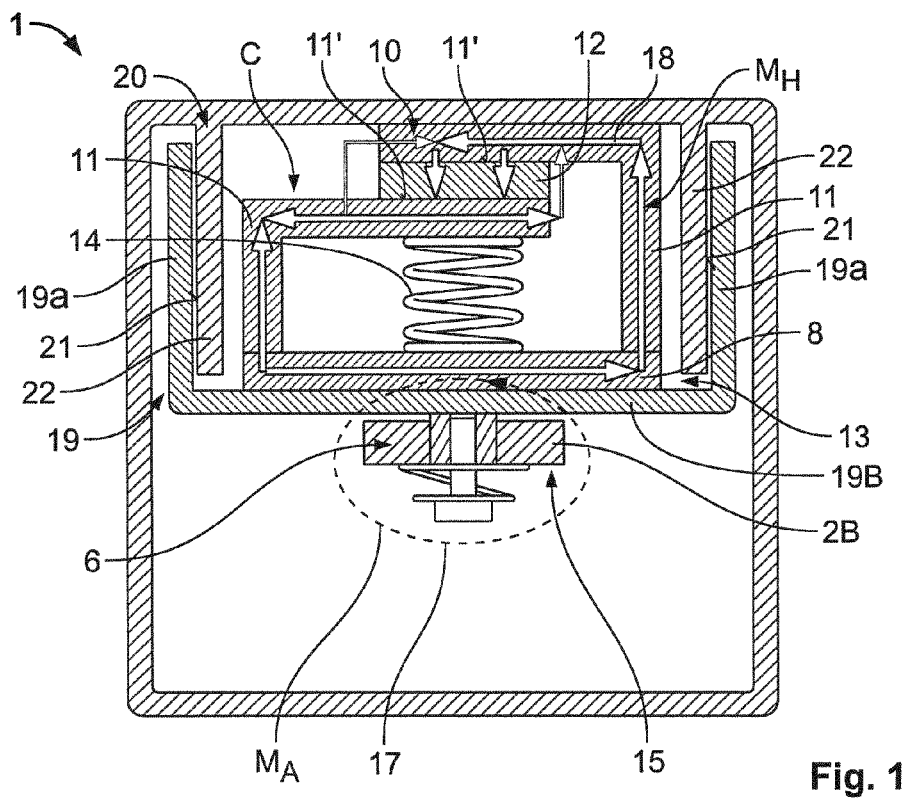
FIG. 1B is a schematic front view of the line protection switch shown in FIG. 1A.

FIG. 1B is a schematic front view of the line protection switch 1 shown in FIG. 1A. The operating method of the actuation member 15 becomes clear here.

In the operating position, load current flows through the contact bridge 2B which acts as a switching member 6 and actuation member 15. The load current induces a substantially annular magnetic actuation field $M_A$ around the switching member 6 or the contact bridge 2B. The magnetic field lines 17 of the magnetic actuation field and the magnetic field lines 18 of the magnetic retention field $M_H$ are illustrated. As can be seen, the magnetic field lines 17, 18 are mutually inverted in the armature 8. The magnetic actuation field consequently acts counter to the magnetisation by the magnetic retention field in the armature 8 produced by the permanent magnet 12 and weakens its magnetisation. The retention force H of the retention member 10 decreases and the counter-force G of the counter-force member 14 prevails so that the line protection switch 1 is actuated and moves from the operating position into the protection position.

In order to keep the structural space as compact as possible, the magnetic field lines 18 of the magnetic retention field $M_H$ in the armature extend perpendicularly relative to the notional connection line between the contacts 2A, 2C.

The switching member may have a guiding element 19 to which the armature 8 is secured. The guiding element 19 is guided on a fixed portion 20 on a guiding or contact face 21 which extends parallel with the movement direction. The contact faces 21 act, on the one hand, as coupling faces for the magnetic retention field and, on the other hand, as a guide for the switching member 6 so that the armature is guided precisely in a movement direction B.

The guiding element 19 may be pot-like, for example, parallelepipedal or cylindrical. The cylindrical shape is particularly advantageous with a rotary movement direction B, the parallelepipedal shape with a translational movement direction B. It preferably defines a space in which the retention member 10 and counter-force member 14 are arranged. Side walls 19a of the guiding element 19 extend parallel with protection walls 22 which protrude from the housing 16 in the direction of the switching member 6 or the contact bridge 2B. The protection walls 22 delimit a space in which the retention member 10 and actuation member 14 are located.

The guiding element 19 may be produced from a magnetically soft material so that it also conducts the magnetic retention field produced by the permanent magnet 12. It, or alternatively the armature 8, may extend in the vicinity of the contact faces 5 so that the magnetic retention field $M_H$ acts on the contact faces 5 and extinguishes arcs which are produced when the contact faces 5 are separated.

The base 19b of the guiding element 19 that connects the side walls 19a extends parallel with the contact bridge 2B and is secured thereto.

A magnetic circuit C comprises in the operating position illustrated here the permanent magnet 12, the magnetic field conducting elements 11 and the armature 8. The magnetic circuit C bundles the magnetic field lines 18 of the magnetic retention field. Since the components of the magnetic circuit C are connected to form a ring closure and are produced from magnetically conductive materials, for example, ferromagnetic materials, the magnetic field lines 18 of the magnetic retention field also extend along a ring closure.

As can be seen from the above description, a magnetic retention member 10 is provided which produces a retention force which is independent of the load current. The counter-force member 14 also produces a retention force which is independent of the load current. The actuation member 15 is formed by the switching member 6, in particular the portion of the load current path 3 located in the switching member 6. It is thus ensured in a simple manner that the actuation of the line protection switch is dependent on the load current without the load current having to be directed to the retention member or the counter-force member. The portion of the switching member 6 through which the load current flows can consequently be constructed in a particularly simple manner.

Figure 2A:
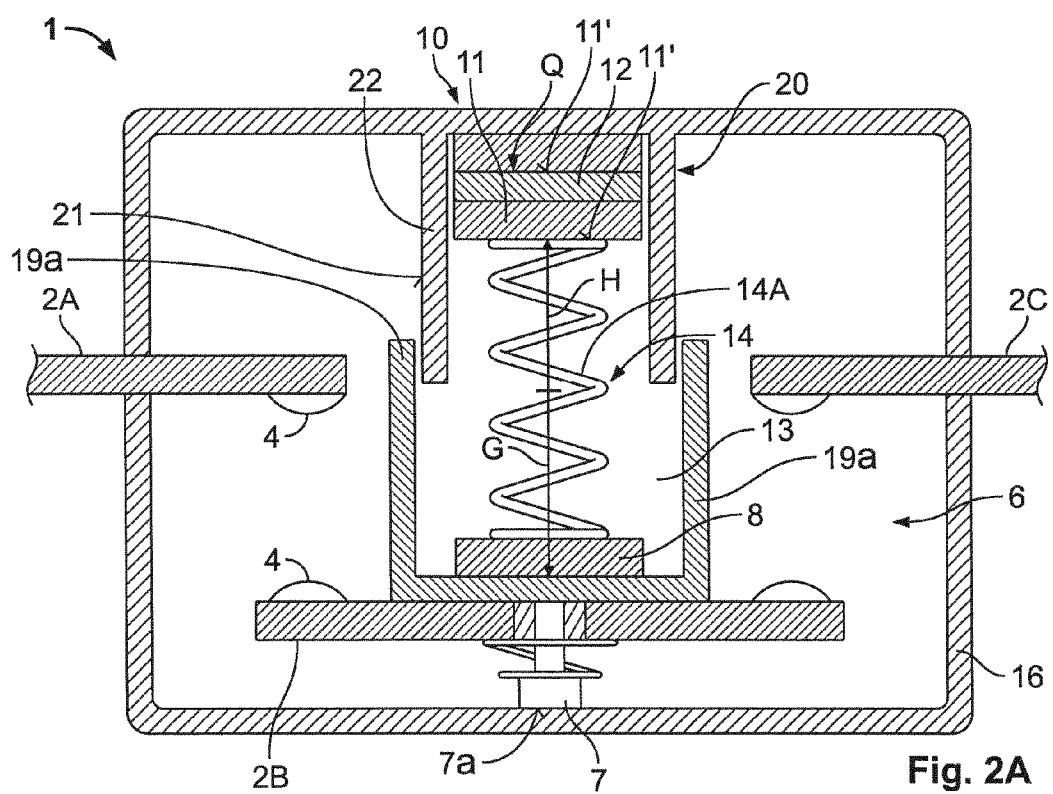
FIG. 2A is a schematic side view of the line protection switch shown in FIG. 1A in the open state.

FIG. 2A is a schematic side view of the line protection switch 1 in the protection position. The connection between the first contact element 2A and the contact bridge 2B or between the contact bridge 2B and the second contact element 2C is interrupted. The contact points 4 of these three elements are no longer in contact. A flow of current through the line protection switch 1 is consequently no longer possible. In the protection position, the counter-force G of the counter-force member 14 prevails with respect to the retention force H of the retention member 10. Although the counter-force G decreases owing to the expansion of the previously compressed spring 14A, the retention force H of the retention member 10 decreases to a greater extent owing to the greatly increased air gap 13. The protection position is consequently assumed in a stable manner and can be modified only by a force which is applied externally.

The travel $H_B$ (FIG. 1A) of the armature 8 is limited by a stop 7a which in the embodiment illustrated is formed by the securing means 7 which strikes the housing 16.

FIG. 2A also shows clearly the space-saving arrangement of the counter-force member 14 and the retention member 10 between two contacts of the electrical circuit.

Figure 2B:
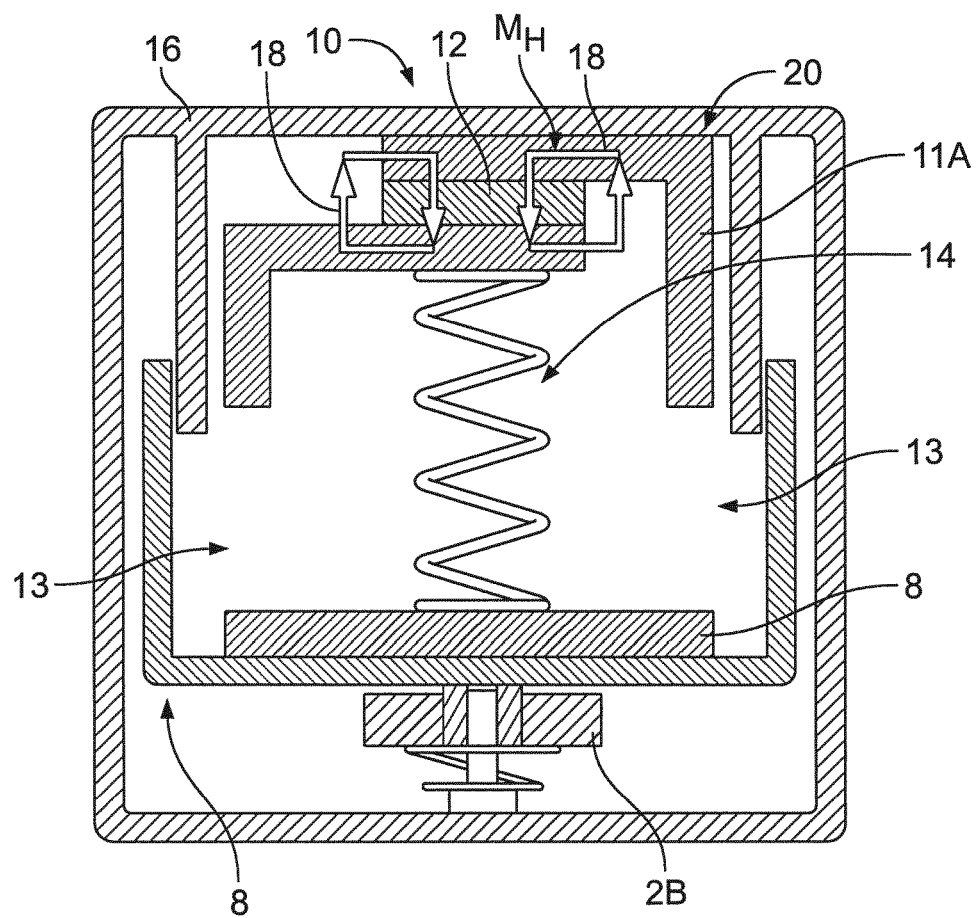
FIG. 2B is a schematic front view of the line protection switch shown in FIG. 2A.

FIG. 2B is a front view of the line protection switch shown in FIG. 2A. The magnetic field lines 18 of the magnetic retention field $M_H$, which in this instance extend primarily around the permanent magnet 12 can clearly be seen. In the protection position, the armature 8 and the fixed portion 20 are separated from each other by means of air gaps 13 which produce a high magnetic resistance and which prevent the magnetic flux through the magnetic field conducting elements 11.

Figure 3A:
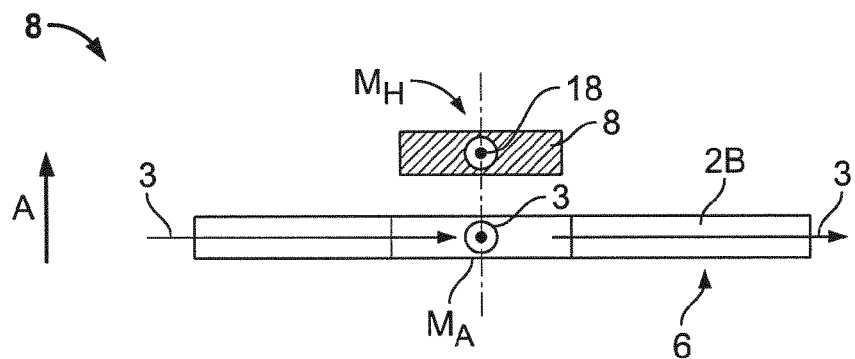
FIG. 3A shows a schematic detail of a line protection switch in order to explain another embodiment.
Figure 3B:
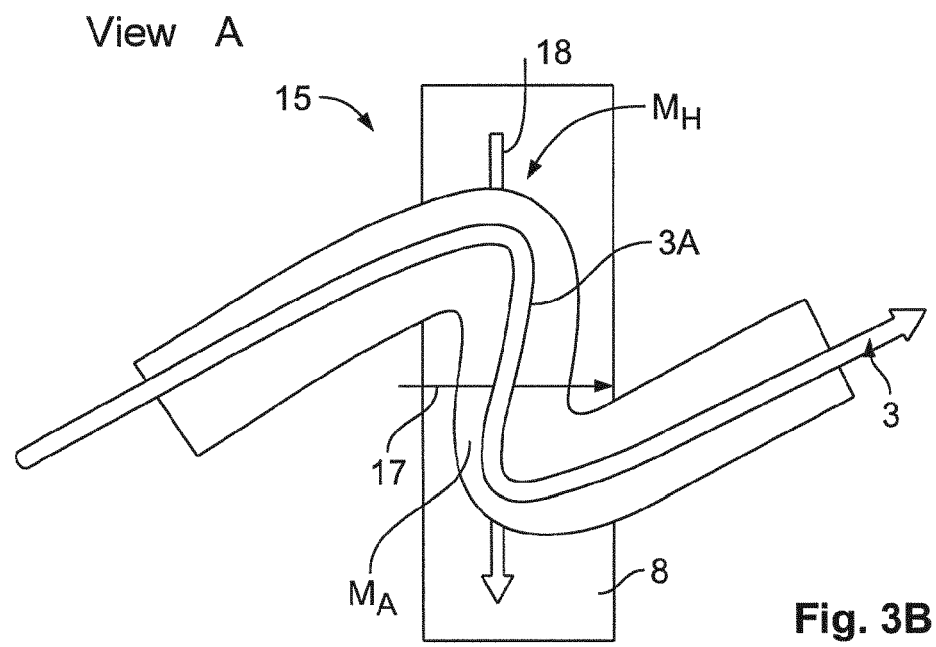
FIG. 3B is a view along the arrow "A" in FIG. 3B.

Another embodiment of the invention is described with reference to FIGS. 3A and 3B. In FIGS. 3A and 3B, for the sake of simplicity, only a cut-out of the switching member 6 or the load current path 3 and the armature 8 are illustrated in a state drawn to an enlarged scale.

In this embodiment, the retention force H is not reduced by means of direct and preferably purely cumulative superimposition of the magnetic retention and actuation field, but instead the non-linear behaviour of magnetically hard or magnetically soft materials is used in the region of the magnetic saturation in order to reduce the retention force. Owing to the magnetic actuation field, the armature 8 is driven to saturation and the direction of the retention force is thereby rotated so that the component thereof acting in the movement direction B becomes smaller. Consequently, the line protection switch is actuated. An advantage of this embodiment is that the saturation and consequently the actuation is carried out independently of the direction of the current. The saturation of the magnetic retention field which leads to the actuation of the line protection switch does not necessarily have to take place in the armature. It could also be carried out at another location in the magnetic circuit. Thus, for instance, the magnetic field conducting elements 11, the coupling faces 11' and/or other components of the magnetic circuit could also be saturated or become saturated.

In this embodiment, the load current path 3 has, in the region of the switching member 6, a portion 3A which extends parallel with the direction 18 of the magnetic retention field $M_H$ in the armature 8. The magnetic actuation field produced by the portion 3A is consequently orientated perpendicularly relative to the magnetic retention field in the armature 8. In order to achieve this orientation, the load current path may extend in an S-shaped or Z-shaped manner in the region of the switching member.

The armature in the operating position is magnetically saturated or almost saturated by the magnetic retention field and magnetic actuation field at the latest at the actuation point so that an increase of the load current and consequently an increase of the magnetic flux of the magnetic actuation field no longer change the amount of magnetisation and consequently the retention force but only the direction thereof. If the direction of the retention force rotates as the load current increases, the component thereof acting in the movement direction B decreases until the counter-force can no longer be compensated for. In contrast to the previous example, therefore, the retention force in this embodiment is not reduced but instead remains substantially constant in terms of value; it is merely rotated.

Figure 4:
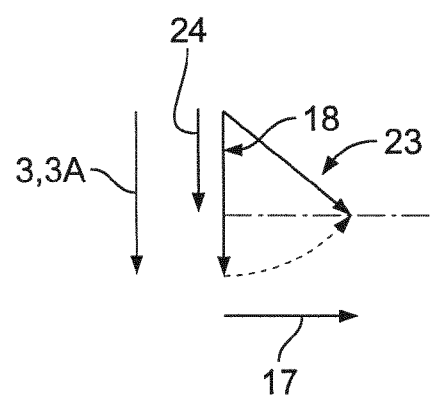
FIG. 4 schematically shows the directions of the magnetisations and the current flow in an advantageous embodiment.

This situation is illustrated in FIG. 4. The initial magnetisation 18 only by the magnetic retention field $M_H$ is rotated by the increasing magnetic actuation field 17, as the vector 23 of the resulting magnetic field shows. Owing to this rotation, with the value remaining the same, the component 24 which produces the component of the retention force H directed in the movement direction B is reduced.

The actuation member 15 is independent of the direction of the current flow; it is only important that a portion of the load current path 3A extends parallel with the magnetic retention field 18. In the situation illustrated in FIG. 4, the current flow could thus not only occur in a downward direction, but also in an upward direction. In this instance, the magnetic field lines of the magnetic actuation field 17 would extend not from left to right, but instead from right to left. The component 24 of the magnetisation in the armature 8, which is parallel with the direction orientated out of the operating position, would also become reduced in this instance and the line protection switch 1 would be actuated.

The portion 3A of the load current path 3 does not have to extend precisely parallel with the magnetic retention field 18. However, if both do not extend precisely parallel, the actuation point becomes dependent on the current direction. This dependency can also be used to adjust the actuation point.

In order to achieve the effect mentioned, it is advantageous for the material to be saturated in a direction which is substantially parallel or anti-parallel with a direction which is orientated out of the operating position and into the protection position.

List of Reference Numerals

1 Line protection switch
2A First contact element
2B Contact bridge
2C Second contact element
3 Load current path
3A Portion of the load current path
4 Contact point
5 Electrical contact face
6 Switching member
7 Securing means
7a Stop
8 Armature
9 Resilient element
10 Retention member
11 Magnetic field conducting elements
11' Coupling faces
12 Permanent magnet
13 Air gap
14 Counter-force member
14A Spring
15 Actuation member
16 Housing
17 Magnetic field lines of the magnetic actuation field
18 Magnetic field lines of the magnetic retention field
19 Guiding element
19A Side walls of the guiding element
19B Base of the guiding element
20 Fixed portion
21 Contact face or guiding face
22 Guiding elements or protection wall
23 Magnetic field direction at saturation
24 Component which produces retention force
B Movement direction
$H_B$ Travel
C Magnetic circuit
G Counter-force
H Retention force
K Contact force
$M_A$ Magnetic actuation field
$M_H$ Magnetic retention field
Q Magnetic field source

The invention claimed is:

1. A line protection switch for protecting an electrical load circuit from an over-current which exceeds a permissible load current, the line protection switch comprising a switching member which can be moved from an operating position into a protection position, wherein contact elements of the line protection switch which can be connected to the load circuit are closed in the operating position and are opened in the protection position, and having a retention member which produces a magnetic retention field ($M_H$) which is independent of the load current and by means of which the switching member is retained in the operating position, and having a counter-force member which is independent of the load current and by means of which the switching member is retained in the protection position, and having an actuation member which is integrated in the switching member and through which load current flows in the operating position and which produces a magnetic actuation field ($M_A$) which is dependent on the load current and which is superimposed on the magnetic retention field ($M_H$).

2. The line protection switch according to claim 1, wherein a retention force (H) produced by the magnetic retention field ($M_H$) and/or a counter-force (G) produced by the counter-force member are independent of the load current.

3. The line protection switch according to claim 1, wherein the retention member comprises a permanent magnet.

4. The line protection switch according to claim 1, wherein the magnetic actuation field ($M_A$) is induced by the load current.

5. The line protection switch according to claim 1, wherein the retention member in the operating position produces a magnetic retention force (H) which acts counter to a counter-force (G) of the counter-force member.

6. The line protection switch according to claim 1, wherein the actuation member is located in the load current path between the contact elements.

7. The line protection switch according to claim 1, wherein the actuation member is formed by a movable contact bridge which is arranged between the contact elements.

8. The line protection switch according to claim 1, wherein a portion of a magnetic circuit, in particular a magnetic circuit in the retention member and/or in the switching member, in particular an armature, is magnetically saturated at least at the actuation point.

9. The line protection switch according to claim 1, wherein the retention force (H) is greater than the counter-force (G) in the operating position and the counter-force (G) is greater than the retention force (H) in the protection position.

10. The line protection switch according to claim 1, wherein the load current path in the actuation member extends parallel with the direction of the magnetic retention field ($M_H$).

11. The line protection switch according to claim 1, wherein the magnetic actuation field ($M_A$) and the magnetic retention field ($M_H$) are superimposed in a perpendicular or parallel manner at least in a portion of a magnetic circuit, in particular a magnetic circuit in the retention member and/or in the switching member, in particular in an armature.

12. The line protection switch according to claim 1, wherein the magnetic retention field ($M_H$) is conducted to the switching member by means of magnetically soft magnetic field conducting elements at least in the operating position.

13. The line protection switch according to claim 1, wherein the direction of the magnetic retention field ($M_H$) in an armature of the switching element extends perpendicularly relative to a connection line between the contacts in the operating position.

14. The line protection switch according to claim 1, wherein at least one protection wall is arranged between contact faces of the line protection switch and the retention member.

15. The line protection switch according to claim 14, wherein the protection wall has a guiding face, along which the switching member is guided in a movement direction (B).

16. The line protection switch according to claim 1, wherein the magnetic retention field ($M_H$) acts as an extinguishing magnetic field in the region of contact points between the contacts and the switching element.

* * * * *